(12) United States Patent
Kakuda et al.

(10) Patent No.: US 10,075,040 B2
(45) Date of Patent: Sep. 11, 2018

(54) ROTARY MACHINE

(71) Applicant: Top Co., Ltd., Fukui (JP)

(72) Inventors: Yoshitaka Kakuda, Fukui (JP);
Tadashi Uno, Fukui (JP)

(73) Assignee: Top Co., Ltd. (JP)

( * ) Notice: Subject to any disclaimer, the term of this patent is extended or adjusted under 35 U.S.C. 154(b) by 323 days.

(21) Appl. No.: 14/894,692

(22) PCT Filed: May 16, 2014

(86) PCT No.: PCT/JP2014/063027
§ 371 (c)(1),
(2) Date: Nov. 30, 2015

(87) PCT Pub. No.: WO2014/192557
PCT Pub. Date: Dec. 4, 2014

(65) Prior Publication Data
US 2016/0111931 A1    Apr. 21, 2016

(30) Foreign Application Priority Data

May 31, 2013    (JP) .................... 2013-116093

(51) Int. Cl.
*H02K 3/28*    (2006.01)
*H02K 5/08*    (2006.01)
(Continued)

(52) U.S. Cl.
CPC ............ *H02K 3/28* (2013.01); *H02K 3/38* (2013.01); *H02K 5/08* (2013.01); *H02K 5/225* (2013.01)

(58) Field of Classification Search
CPC ..................................... H02K 3/28; H02K 3/38
See application file for complete search history.

(56) References Cited

U.S. PATENT DOCUMENTS 1,809,864 A * 6/1931 Pearson ............... H02G 3/083
16/2.2
2,816,951 A * 12/1957 Sperry ............... H01B 17/306
174/153 G
(Continued)

FOREIGN PATENT DOCUMENTS

JP    06-013365    2/1994
JP    06-327177    11/1994
(Continued)

OTHER PUBLICATIONS

International Search Report for Application No. PCT/JP2014/063027 dated Aug. 19, 2014.
(Continued)

*Primary Examiner* — Robert W Horn
(74) *Attorney, Agent, or Firm* — Lerner, David, Littenberg, Krumholz & Mentlik, LLP

(57) ABSTRACT

A rotary machine includes a rotor and a resin-molded stator which includes a stator core, a coil, a molded portion, a lead line, a bush and a bush supporting frame. The stator core is formed by laminating steel sheets. The coil is formed by winding a conducting wire around a tooth formed to the stator core. The molded portion covers the coil. The lead line is formed by the conducting wire continuing from an end portion of a power supply side of the coil. The bush is formed with a penetrated insert hole where the lead line is passed through. The bush supporting frame is supported by the molded portion and is formed with a penetrated attaching hole into which the bush is fitted in. The lead line is drawn out to the outside of the molded portion from the attaching hole.

11 Claims, 13 Drawing Sheets

(51) Int. Cl.
*H02K 5/22* (2006.01)
*H02K 3/38* (2006.01)

(56) References Cited

U.S. PATENT DOCUMENTS

| | | | | |
|---|---|---|---|---|
| 2,820,088 | A * | 1/1958 | Sperry | H01B 17/306 16/2.1 |
| RE24,438 | E * | 2/1958 | Moorhead | H02G 3/083 174/153 G |
| 3,214,512 | A * | 10/1965 | Deakin | H01B 17/306 174/153 R |
| 4,460,227 | A * | 7/1984 | Ball | H01R 13/5205 174/152 G |
| 4,626,721 | A * | 12/1986 | Ouchi | F04D 29/126 174/151 |
| 4,985,654 | A * | 1/1991 | Morikane | H01R 39/36 174/23 R |
| 5,113,101 | A * | 5/1992 | Liu | H01R 13/5221 174/75 D |
| 5,596,176 | A * | 1/1997 | Everitt | H02G 3/088 174/151 |
| 5,847,477 | A * | 12/1998 | Shiroyama | H02K 5/225 310/249 |
| 6,100,472 | A * | 8/2000 | Foss | G02B 6/4428 174/77 R |
| 6,417,588 | B2 * | 7/2002 | Niimi | H01R 39/383 310/249 |
| 6,538,350 | B2 * | 3/2003 | Martin | H02K 5/225 310/43 |
| 6,546,945 | B2 * | 4/2003 | Ishigaki | F02M 25/0836 137/15.18 |
| 6,876,109 | B2 * | 4/2005 | Matsushita | H02K 1/145 310/257 |
| 7,434,814 | B2 * | 10/2008 | Kumakura | F16L 5/10 16/2.1 |
| 7,683,261 | B2 * | 3/2010 | Kesler | H05K 5/069 174/50.57 |
| 7,696,666 | B2 * | 4/2010 | Sumcad | H01R 39/385 310/238 |
| 8,973,251 | B2 * | 3/2015 | Endo | H02K 15/14 29/596 |
| 9,337,702 | B2 * | 5/2016 | Kamiya | H02K 5/08 |
| 9,667,114 | B2 * | 5/2017 | Kurita | H02K 3/28 |
| 2007/0122300 | A1 * | 5/2007 | Sakai | F04D 5/002 417/423.3 |
| 2015/0130377 | A1 * | 5/2015 | Hidaka | F04D 5/002 318/400.11 |
| 2015/0137634 | A1 * | 5/2015 | Kurita | H02K 3/28 310/71 |
| 2015/0280509 | A1 * | 10/2015 | Shi | H02K 3/38 310/71 |
| 2016/0111931 | A1 * | 4/2016 | Kakuda | H02K 5/08 310/43 |
| 2016/0380502 | A1 * | 12/2016 | Koiwai | H02K 5/08 310/71 |

FOREIGN PATENT DOCUMENTS

| | | |
|---|---|---|
| JP | 09-322467 | 12/1997 |
| JP | 2009-112067 A | 5/2009 |
| JP | 2013-062901 A | 4/2013 |

OTHER PUBLICATIONS

Office Action corresponding to JP Patent Application No. 2015-519781, dated Jul. 26, 2016, 2 pgs.

* cited by examiner

ROTARY MACHINE

CROSS REFERENCE TO RELATED APPLICATIONS

The present application is a national phase entry under 35 U.S.C. § 371 of International Application No. PCT/JP2014/063027, filed May 16, 2014, which claims priority to Japanese Patent Application No. 2013-116093, filed May 31, 2013, the disclosures of which are incorporated herein by reference.

TECHNICAL FIELD

The present invention relates to a rotary machine such as a motor or an electric generator.

BACKGROUND ART

A technique related to a stator equipped in a rotary machine such as a motor or an electric generator has been proposed. For example, a molded motor is disclosed in Patent Literature 1. In this molded motor, a stator iron core and a coil end are sealed by a mold material. This molded motor has a division type bushing at a lead line outlet portion. The division type bushing forms a lead line through hole. The lead line through hole becomes a desired interference against the lead line outer diameter at the molding temperature in the bushing assembled state to prevent resin leakage from the outlet lead line portion during mold-molding.

A molded motor is disclosed in Patent Literature 2. In this molded motor, a stator is formed by winding a coil around an insulation layer. The insulation layer is formed by performing pre-molding to the steel sheet laminated stator iron core. In a surface of the output side of the stator, a wiring board composed of a doughnut shaped printed wiring board is provided. A lead line is extending from the wiring board. A bushing is provided to draw out the lead line to the outside. The wiring board, the stator and the bushing are integrally molded by a mold resin and a frame is formed. The bushing is an elastic body. The through hole in the bushing where the lead line passes through is formed to be larger than the diameter of the lead line. A protruding portion which presses the lead line is formed from the inner peripheral of the through hole. In Patent Literature 2, as another structure, a molded motor having a synthetic resin bushing is disclosed. In this bushing, a water proof member is attached to the outlet portion of the lead line which is located in the inner side portion of the frame. The water proof member is made of an elastic member such as rubber. A through hole is provided so as to pass through the bushing and the water proof member. The lead line is arranged in the through hole. The water proof member is attached to the inner portion of the bushing. Mold-molding is carried out after the bushing and the water proof member are attached.

In Patent Literature 3, a stator of a rotary electric machine is disclosed. In this stator, a lead line and a power line are electrically connected through an intermediate bus bar which enables stress absorption. At a connection portion of the lead line and the intermediate bus bar, the lead line and the intermediate bus bar are enclosed by a resin member in which the intermediate bus bar is inserted. A tip end of the lead line and a tip end of the intermediate bus bar are welded.

CITATION LIST

Patent Literature

PATENT LITERATURE1: JP-A-06-327177
PATENT LITERATURE2: JP-A-2009-112067
PATENT LITERATURE3: JP-A-2013-62901

SUMMARY OF INVENTION

Problems to be Solved by the Invention

In a stator of a rotary machine, to connect a conducting wire continuing from an end portion of a power supply side of a coil and a power line (lead line) which is connected to the power supply, a wire connecting member is used. As the wire connecting member, a bus bar is shown as an example. In this kind of wire connecting member, as for example, it is provided near a coil end portion of a coil at the upper part of an end surface at one side of a stator core in a lamination direction. The lamination direction is the direction where steel sheets are laminated in the stator core. When the stator is resin molded, the wire connecting member is covered by a molded portion which is formed by resin molding along with a coil formed to the stator core. Therefore, the height of the lamination direction of the molded portion is, in the side of the end portion of the stator core where the wire connecting member is provided, made to be a dimension that can cover the wire connecting member.

An object of the present invention is to provide a rotary machine that includes a resin molded stator having a configuration that can be miniaturize.

Solutions to the Problems

An aspect of the present invention is a rotary machine including: a rotor; and a resin-molded stator, wherein the stator includes: a stator core formed by laminating steel sheets; a coil formed by winding a conducting wire around a tooth formed to the stator core; a molded portion covering the coil formed to the stator core; a lead line formed by the conducting wire continuing from an end portion of a power supply side of the coil; a bush formed with a penetrated insert hole where the lead line is passed through; and a bush supporting frame which is supported by the molded portion and which is formed with a penetrated attaching hole which connects to an outside of the molded portion into which the bush is fitted in, wherein the lead line is drawn out to the outside of the molded portion from the attaching hole in a state where the lead line is passed through the insert hole and the bush is fitted in into the attaching hole.

According to this, the wire connection of the lead line will be unnecessary in the portion covered by the molded portion. The lead line is directly drawn out through the attaching hole to the outside of the molded portion. Accordingly, a wire connecting member such as a bus bar is unnecessary. It is possible to miniaturize the stator in the lamination direction. The lead line which is drawn out to the outside of the molded portion can be a power line for electric power supply. By fitting in the bush into the attaching hole which is formed to the bush supporting frame, it is possible to inhibit resin leakage in the resin molding when forming the molded portion.

This rotary machine may be configured as follows. The stator may include: as the coils: a U-phase coil; a V-phase coil; and a W-phase coil, as the lead lines: a U-phase lead line formed by the conducting wire continuing from the end portion of the power supply side of the U-phase coil; a V-phase lead line formed by the conducting wire continuing from the end portion of the power supply side of the V-phase coil; and a W-phase lead line formed by the conducting wire continuing from the end portion of the power supply side of the W-phase coil, as the bushes: a first bush formed with a first insert hole as the insert hole which the U-phase lead line is passed through; a second bush formed with a second insert hole as the insert hole which the V-phase lead line is passed through; and a third bush formed with a third insert hole as the insert hole which the W-phase lead line is passed through, wherein, to the bush supporting frame there may be formed a first attaching hole which is the attaching hole where the first bush is fitted in, a second attaching hole which is the attaching hole where the second bush is fitted in, and a third attaching hole which is the attaching hole where the third bush is fitted in, wherein the U-phase lead line may be drawn out to the outside of the molded portion from the first attaching hole in a state where the U-phase lead line is passed through the first insert hole and the first bush is fitted in into the first attaching hole, wherein the V-phase lead line may be drawn out to the outside of the molded portion from the second attaching hole in a state where the V-phase lead line is passed through the second insert hole and the second bush is fitted in into the second attaching hole, wherein the W-phase lead line may be drawn out to the outside of the molded portion from the third attaching hole in a state where the W-phase lead line is passed through the third insert hole and the third bush is fitted in into the third attaching hole.

According to this, it is possible to draw out the lead line to the outside of the molded portion by the U-phase, the V-phase and the W-phase, respectively. In the above, "U-phase", "V-phase" and "W-phase" are identifiers to distinguish each phase in the three-phase AC.

The stator may include, as the coils: two or more predetermined number of the U-phase coils; the predetermined number of the V-phase coils; and the predetermined number of the W-phase coils, as the lead lines: the predetermined number of the U-phase lead lines which are formed by the conducting wires continuing from each end portion of the predetermined number of the U-phase coils; the predetermined number of the V-phase lead lines which are formed by the conducting wires continuing from each end portion of the predetermined number of the V-phase coils; and the predetermined number of the W-phase lead lines which are formed by the conducting wires continuing from each end portion of the predetermined number of the W-phase coils, as the bushes: the first bush formed with the predetermined number of the first insert holes where the predetermined number of the U-phase lead lines are passed through, respectively; the second bush formed with the predetermined number of the second insert holes where the predetermined number of the V-phase lead lines are passed through, respectively; and the third bush formed with the predetermined number of the third insert holes where the predetermined number of the W-phase lead lines are passed through, respectively, wherein the predetermined number of the U-phase lead lines may be drawn out to the outside of the molded portion from the first attaching hole in a state where the predetermined number of the U-phase lead lines are respectively passed through the predetermined number of the first insert holes and the first bush is fitted in into the first attaching hole, wherein the predetermined number of the V-phase lead lines may be drawn out to the outside of the molded portion from the second attaching hole in a state where the predetermined number of the V-phase lead lines are respectively passed through the predetermined number of the second insert holes and the second bush is fitted in into the second attaching hole, wherein the predetermined number of the W-phase lead lines may be drawn out to the outside of the molded portion from the third attaching hole in a state where the predetermined number of the W-phase lead lines are respectively passed through the predetermined number of the third insert holes and the third bush is fitted in into the third attaching hole. According to this, the plurality of lead lines of the same phase can be drawn out to the outside of the molded portion respectively.

The bush may include a ring shaped press-in portion protruding in a radial direction of the bush at an outer peripheral surface of the bush, wherein an inner diameter of the attaching hole in the position where the press-in portion is placed in a state where the bush is fitted in into the attaching hole may be set to be smaller than an outer diameter of the pressed-in portion. According to this, the fitting in the bush into the attaching hole can be made in a pressed-in state. The bush is compressed towards the radial direction. Associated with this, the insert hole formed to the bush is compressed and deformed to the radial direction. The inner peripheral surface of the insert hole can be pressed to the outer peripheral surface of the lead line. The inner peripheral surface of the insert hole and the outer peripheral surface of the lead line can be brought into a more tight contact state.

Advantageous Effects of the Invention

According to the present invention, it is possible to obtain a rotary machine that includes a resin molded stator having a structure that can be miniaturize.

DESCRIPTION OF EMBODIMENTS

Figure 1:
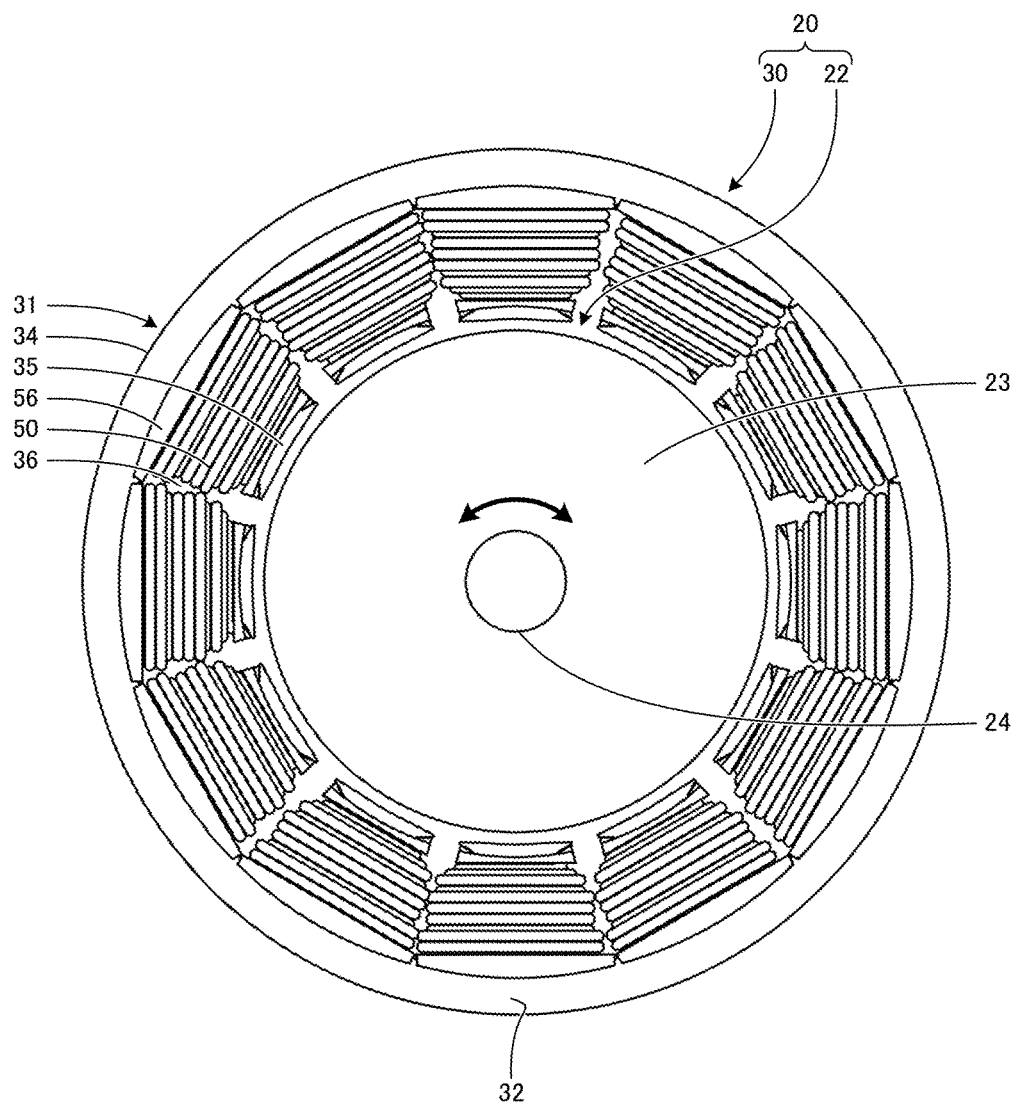
FIG. 1 is a plan view illustrating a schematic structure excluding a part of a rotary machine.

Embodiments for carrying out the present invention will be described with reference to the drawings. The present invention is not limited to the configurations described below, and various configurations can be employed based on the same technical idea. For example, a part of the configurations shown below may be omitted or may be replaced by another configuration or the like. Another configuration may be included.

<Rotary Machine>

A rotary machine 20 is, for example, a motor or an electric generator. The rotary machine 20 like a motor or an electric generator is mounted on various products. For example, the rotary machine 20 is mounted on an electric vehicle. As the electric vehicle, an electric car, an electric bicycle, an electric wheelchair, an electric cart, or an electric food trolley are shown as examples. The electric car includes a hybrid car. When the rotary machine 20 is a motor, the rotary machine 20 is used as, for example, a power source for moving an electric vehicle. The rotary machine 20, as shown in FIG. 1, includes a rotor 22 and a stator 30.

The rotor 22 includes a rotor core 23, a plurality of permanent magnets, and a shaft 24. In FIG. 1, illustration of the permanent magnets is omitted. The rotor core 23 is formed by laminating electrical steel sheets, for example, while punching the electrical steel sheet with a press machine. The plurality of permanent magnets are mounted in the rotor core 23. For example, the plurality of permanent magnets are each housed in a plurality of spaces which are formed in the rotor core 23 and which correspond to the number of the permanent magnets. When the rotary machine 20 is a motor, the motor that includes such a rotor 22 is called an Interior Permanent Magnet (IPM) motor. The plurality of permanent magnets may be mounted to the outer peripheral surface of the rotor core 23. The motor that includes such a rotor 22 is called a Surface Permanent Magnet (SPM) motor.

The shaft 24 is secured to a through hole formed at the center portion of the rotor core 23. Bearings are attached to the shaft 24 at both sides of the rotor core 23. The bearings are supported by supporting portions provided at the stator 30. In FIG. 1, illustrations of the bearings and the supporting portions are omitted. The shaft 24 serves as the rotation axis. The rotor 22 rotates about the shaft 24 as the rotational center. The rotor 22 is similar to the rotor included in a motor or an electric generator that has been publicly known. Therefore, other descriptions related to the rotor 22 will be omitted.

Figure 2:
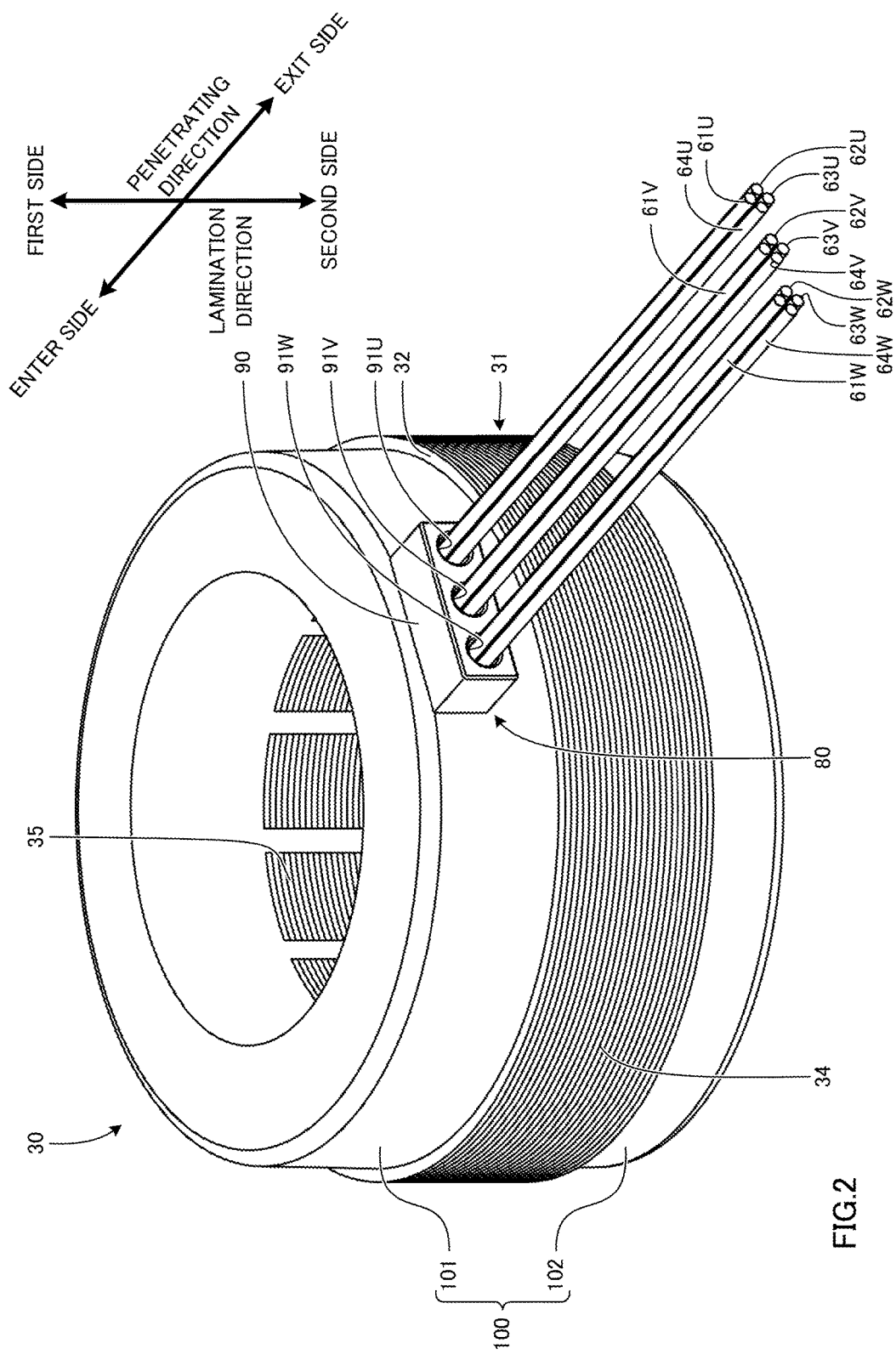
FIG. 2 is a perspective view illustrating a schematic structure of a stator.

As illustrated in FIGS. 1 and 2, the stator 30 includes a stator core 31, a plurality of coils 50, a drawing outlet portion 80, and a molded portion 100. In FIG. 1, illustration of the drawing outlet portion 80 and the molded portion 100 are omitted. The stator core 31 includes, as illustrated in FIG. 1, a yoke 34 and a plurality of teeth 35. In the example illustrated in FIG. 1, the stator core 31 includes twelve teeth 35. In stator core 31, the twelve teeth 35 are formed to each protrude toward the rotor 22 (shaft 24) side from the yoke 34 at intervals of an equal angle.

Twelve slots 36 are formed at the stator core 31 including the twelve teeth 35. The slot 36 is a space formed between the teeth 35 adjacent to each other. The number of the slots of the stator 30 is properly set by taking the various conditions such as required performances into consideration.

The stator core 31 is formed by laminating electrical steel sheets while punching the electrical steel sheet with a press machine. In the embodiment, it is described by using an example with the stator core 31 where the number of teeth 35 is twelve and the number of slots is twelve. The direction in which the electrical steel sheets are laminated is referred to as "lamination direction" when forming the stator core 31. The lamination direction coincides with a direction in which the electrical steel sheets are laminated in the rotor core 23. One side of the lamination direction is referred to as "first side". The other side of the lamination direction is referred to as "second side". With respect to both end surfaces of the stator core 31 in the lamination direction, the end surface of the stator core 31 on the first side of the lamination direction is referred to as "first end surface 32", and the end surface of the stator core 31 on the second side of the lamination direction is referred to as "second end surface". The second end surface is the end surface of the stator core 31 which is on the opposite side of the first end surface 32 in the lamination direction. The second end surface is not illustrated.

The coil 50 is formed by winding a conducting wire around the teeth 35. For example, the coil 50 is formed by concentratedly wire winding the conducting wire around the teeth 35 (see FIG. 1). The coil 50 is formed by using a predetermined winding machine. When forming the coil 50, the stator core 31 is covered by an insulation portion 56 at a predetermined region (see FIG. 1). The predetermined region includes predetermined portions at each of the first end surface 32 and the second end surface, and a side surface of the slot 36. In accordance with the insulation portion 56, it is possible to secure electrical insulation between the stator core 31 and the coil 50. In the stator core 31 having twelve teeth 35, the total number of the coil 50 in the stator 30 is twelve (see FIG. 1). A publicly known wire winding technology can be employed to form the coil 50 to the stator core 31. Therefore, other descriptions related to the above will be omitted.

Figure 3:
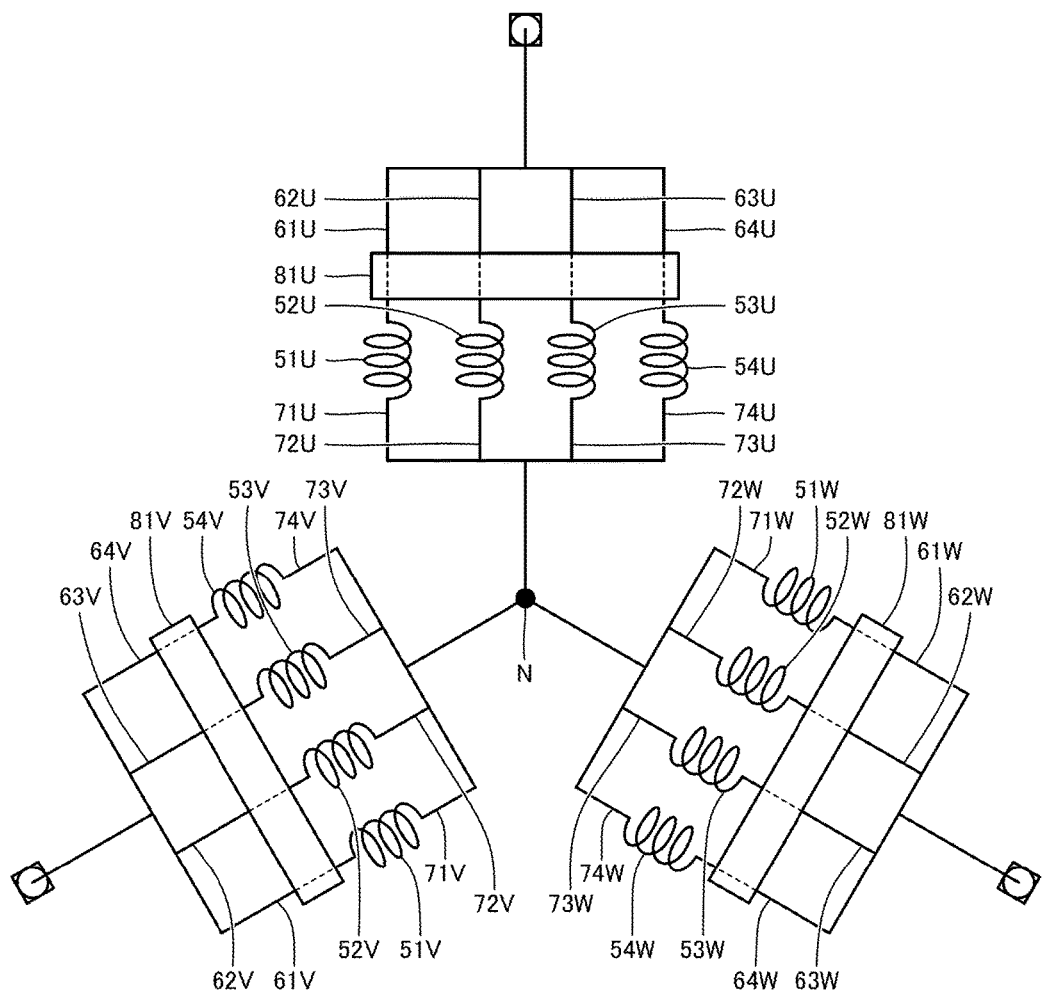
FIG. 3 is one example of a wire connection diagram.

The twelve coils 50, as shown in FIG. 3, are categorized into each phase of the coils 50 corresponding to three-phase AC. In the embodiment, the first phase in the three-phase AC is referred to as "U-phase". The second phase in the three-phase AC is referred to as "V-phase". The third phase in the three-phase AC is referred to as "W-phase". Out of the twelve coils 50, four predetermined coils 50 form coils 51U, 52U, 53U, 54U of the U-phase. Other four coils 50 of twelve coils 50 form coils 51V, 52V, 53V, 54V of the V-phase. Still another four coils 50 of the twelve coils 50 form coils 51W, 52W, 53W, 54W of the W-phase. In the stator 30, each coil 50 of each phase is serially formed, for example, U-phase, V-phase, W-phase, U-phase, and so on, in a circumferential direction having the shaft 24 of the rotor 22 as the center. The arrow having a bidirectional arrow near the shaft 24 in FIG. 1 indicates the circumferential direction described previously. In the embodiment, when the coils 51U, 52U, 53U, 54U, the coils 51V, 52V, 53V, 54V, and the coils 51W, 52W, 53W, 54W are not distinct or when the coils are collectively called, it is referred to as "coil 50".

The coils 51U, 52U, 53U, 54U, the coils 51V, 52V, 53V, 54V and the coils 51W, 52W, 53W, 54W are, as shown in FIG. 3, star connected. The coils 51U, 52U, 53U, 54U are connected in parallel. The coils 51V, 52V, 53V, 54V are connected in parallel. The coils 51W, 52W, 53W, 54W are connected in parallel.

The conducting wire that forms the coil 51U is drawn out at a winding start side and a winding end side of the coil 51U. Each drawn out conducting wire forms two lead lines 61U, 71U, respectively. The conducting wire that forms the coil 52U is drawn out at a winding start side and a winding end side of the coil 52U. Each drawn out conducting wire forms two lead lines 62U, 72U, respectively. The conducting wire that forms the coil 53U is drawn out at a winding start side and a winding end side of the coil 53U. Each drawn out conducting wire forms two lead lines 63U, 73U, respectively. The conducting wire that forms the coil 54U is drawn out at a winding start side and a winding end side of the coil 54U. Each drawn out conducting wire forms two lead lines 64U, 74U, respectively. The lead lines 61U, 62U, 63U, 64U formed on one of the side of the winding start side and the winding end side of the coils 51U, 52U, 53U, 54U are the lead lines on the power supply side in each coil 51U, 52U, 53U, 54U. The lead lines 71U, 72U, 73U, 74U formed on one of the other side of the winding start side and the winding end side of the coils 51U, 52U, 53U, 54U are the lead lines on a side of a neutral point N in each coil 51U, 52U, 53U, 54U.

The conducting wire that forms the coil 51V is drawn out at a winding start side and a winding end side of the coil 51V. Each drawn out conducting wire forms two lead lines 61V, 71V, respectively. The conducting wire that forms the coil 52V is drawn out at a winding start side and a winding end side of the coil 52V. Each drawn out conducting wire forms two lead lines 62V, 72V, respectively. The conducting wire that forms the coil 53V is drawn out at a winding start side and a winding end side of the coil 53V. Each drawn out conducting wire forms two lead lines 63V, 73V, respectively. The conducting wire that forms the coil 54V is drawn out at a winding start side and a winding end side of the coil 54V. Each drawn out conducting wire forms two lead lines 64V, 74V, respectively. The lead lines 61V, 62V, 63V, 64V formed on one of the side of the winding start side and the winding end side of the coils 51V, 52V, 53V, 54V are the lead lines on the power supply side in each coil 51V, 52V, 53V, 54V. The lead lines 71V, 72V, 73V, 74V formed on one of the other side of the winding start side and the winding end side of the coils 51V, 52V, 53V, 54V are the lead lines on a side of the neutral point N in each coil 51V, 52V, 53V, 54V.

The conducting wire that forms the coil 51W is drawn out at a winding start side and a winding end side of the coil 51W. Each drawn out conducting wire forms two lead lines 61W, 71W, respectively. The conducting wire that forms the coil 52W is drawn out at a winding start side and a winding end side of the coil 52W. Each drawn out conducting wire forms two lead lines 62W, 72W, respectively. The conducting wire that forms the coil 53W is drawn out at a winding start side and a winding end side of the coil 53W. Each drawn out conducting wire forms two lead lines 63W, 73W, respectively. The conducting wire that forms the coil 54W is drawn out at a winding start side and a winding end side of the coil 54W. Each drawn out conducting wire forms two lead lines 64W, 74W, respectively. The lead lines 61W, 62W, 63W, 64W formed on one of the side of the winding start side and the winding end side of the coils 51W, 52W, 53W, 54W are the lead lines on the power supply side in each coil 51W, 52W, 53W, 54W. The lead lines 71W, 72W, 73W, 74W formed on one of the other side of the winding start side and the winding end side of the coils 51W, 52W, 53W, 54W are the lead lines on a side of the neutral point N in each coil 51W, 52W, 53W, 54W.

The lead lines 71U, 72U, 73U, 74U of the U-phase, the lead lines 71V, 72V, 73V, 74V of the V-phase, and the lead lines 71W, 72W, 73W, 74W of the W-phase are each connected at an end portion of the opposite side of the coil 50. According to this, the neutral point N is formed (see FIG. 3). In FIG. 1, the illustration of each lead line described above is omitted. In the embodiment, when the lead lines 61U, 62U, 63U, 64U, the lead lines 61V, 62V, 63V, 64V, and lead lines 61W, 62W, 63W, 64W are not distinct or when the lead lines are collectively called, it is referred to as "lead lines 61, 62, 63, 64".

The drawing outlet portion 80 is formed by a first bush 81U, a second bush 81V, a third bush 81W and a bush supporting frame 90. Four first insert holes 82U are formed in the first bush 81U (see FIG. 4). The four first insert holes 82U are penetrated through holes which the lead lines 61U, 62U, 63U, 64U are passed through, respectively (see FIG. 5). Four second insert holes 82V are formed in the second bush 81V (see FIG. 4). The four second insert holes 82V are penetrated through holes which the lead lines 61V, 62V, 63V, 64V are passed through, respectively (see FIG. 5). Four third insert holes 82W are formed in the third bush 81W (see FIG. 4). The four third insert holes 82W are penetrated through holes which the lead lines 61W, 62W, 63W, 64W are passed through, respectively (see FIG. 5).

In the embodiment, the first bush 81U, the second bush 81V and the third bush 81W have the same shape and are same members which are formed with a same material. Therefore, the first insert holes 82U, the second insert holes 82V and the third insert holes 82W are through holes having the same shape. The positions of the first insert holes 82U in the first bush 81U and the positions of the second insert holes 82V in the second bush 81V and the positions of the third insert holes 82W in the third bush 81W are also the same. In the embodiment, when the first bush 81U, the second bush 81V and the third bush 81W are not distinct or when the bushes are collectively called, it is referred to as "bush 81". When the first insert holes 82U, the second insert holes 82V and the third insert holes 82W are not distinct or when the insert holes are collectively called, it is referred to as "insert holes 82".

Figure 5:
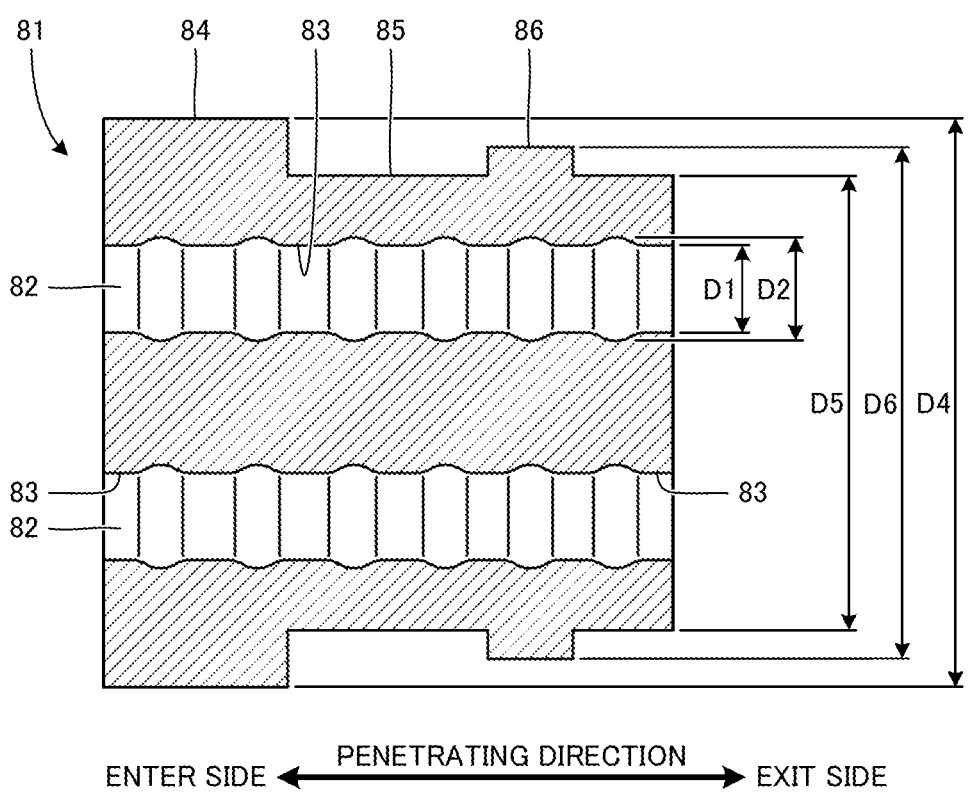
FIG. 5 is a sectional view taken along line E-E of FIG. 4.
Figure 8:
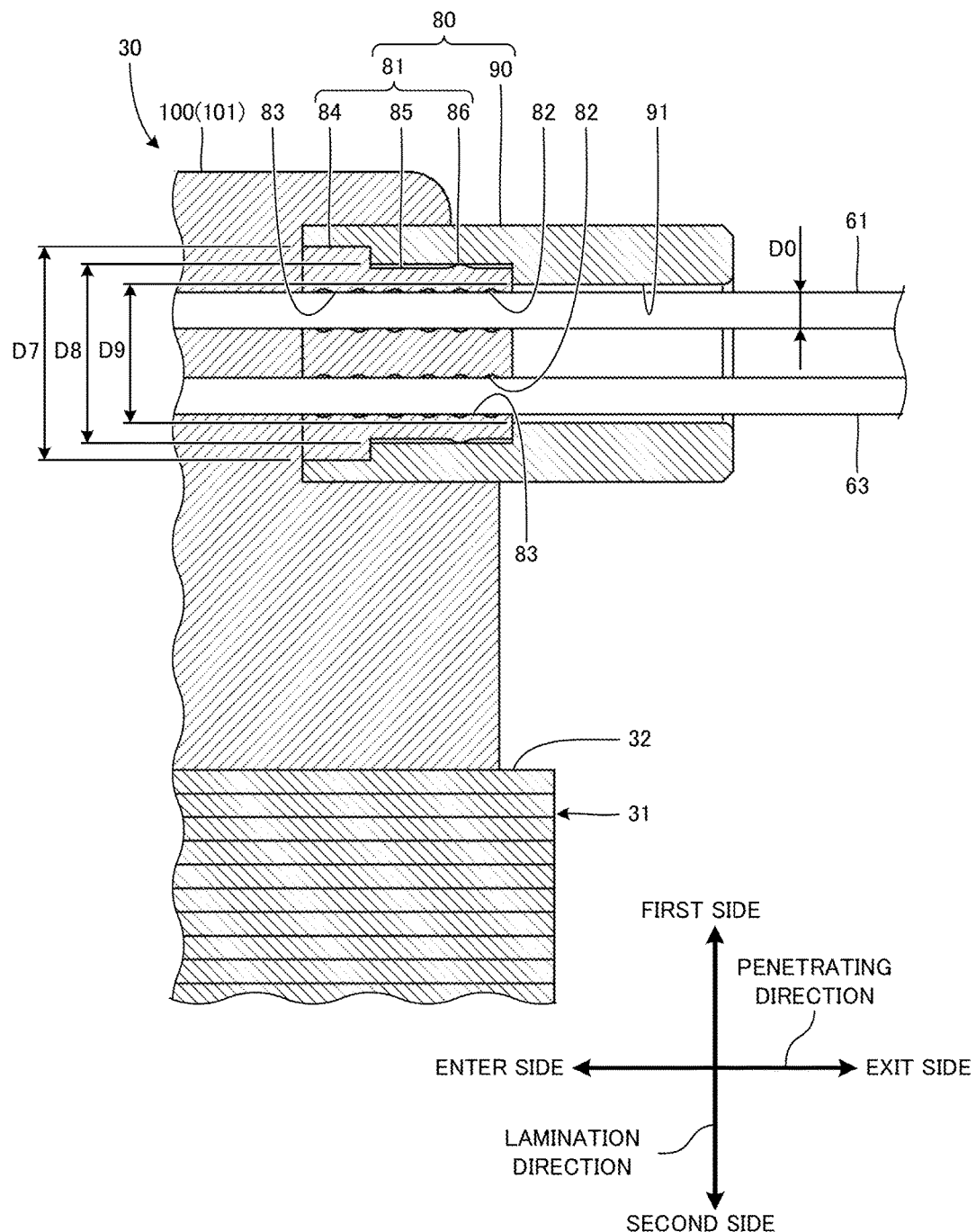
FIG. 8 is a partial sectional view of a stator taken along a penetrating direction in a position of an insert hole and an attaching hole. A schematic structure of the stator having a drawing outlet portion based on the bush illustrated in FIGS. 6 and 7 is illustrated.

The bush 81 is, for example, formed by an elastic member having elasticity such as rubber. Inner peripheral ribs 83 are formed at an inner peripheral surface of the insert hole 82. The inner peripheral ribs 83 are, for example, as shown in FIG. 5, plurally formed in a predetermined equal interval in a penetrating direction. The penetrating direction is a direction where the insert hole 82 extends. With respect to an inner diameter of the insert hole 82, an inner diameter D1 at portions of the inner peripheral ribs 83 are set to be smaller than an outer diameter D0 (see FIG. 8) of the lead lines 61, 62, 63, 64 (inner diameter D1<outer diameter D0). On the other hand, an inner diameter D2 at the portions where the inner peripheral ribs 83 are not formed is set to be larger than the outer diameter D0 of the lead lines 61, 62, 63, 64 (inner diameter D2>outer diameter D0). The relationship of the inner diameters D1, D2 is "inner diameter D1<inner diameter D2". One of the inner diameter D1 and the inner diameter D2 may be set to become the same as the outer diameter D0. The outer diameter D0 of the lead lines 61, 62, 63, 64 is also the outer diameter of the conducting wire which forms the coil 50. In FIG. 8, the lead lines 61, 63 are shown to correspond to the state illustrated in FIG. 2. In FIG. 8, illustration of part of the configuration of the coil 50 and the like is omitted.

Figure 4:
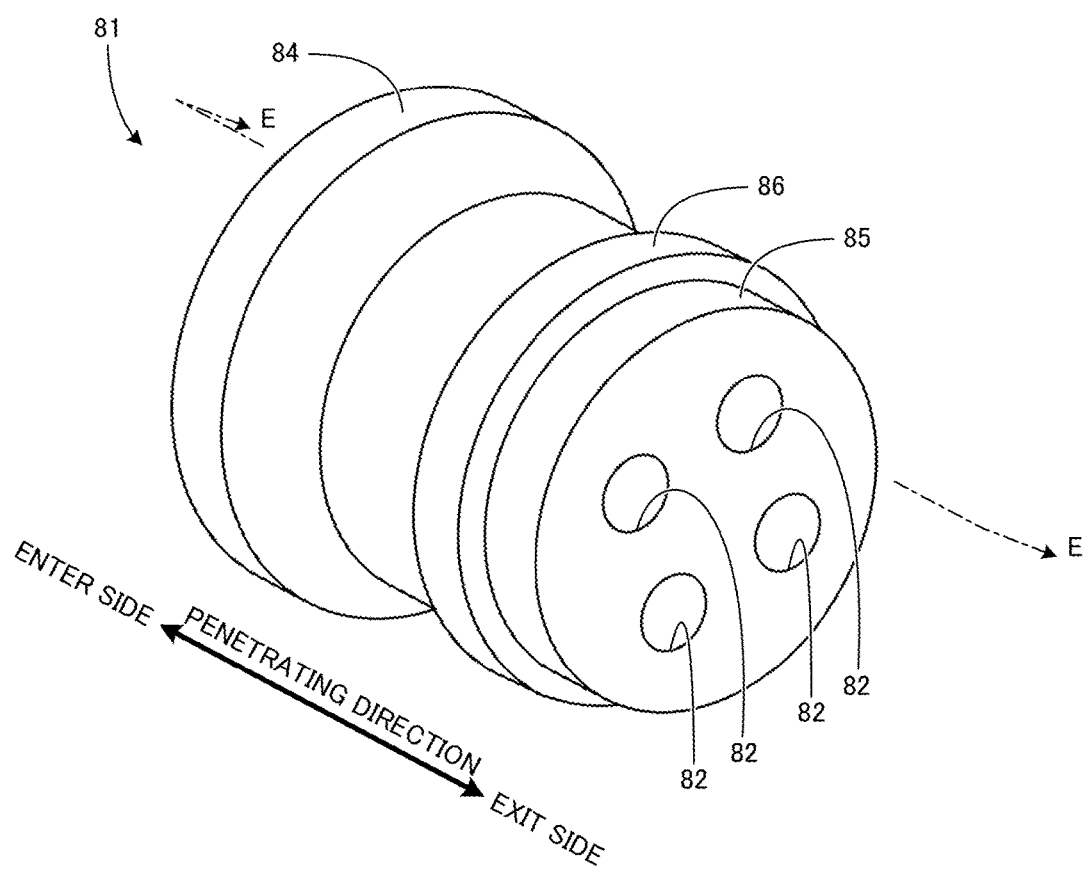
FIG. 4 is a perspective view illustrating a schematic structure of a bush.

The bush 81 has, as shown in FIGS. 4 and 5, an integral shape with a flange portion 84 with an outer diameter D4 and a body portion 85 with an outer diameter D5 continuing toward the penetration direction. In a predetermined region of the body portion 85 in the penetration direction, an outer peripheral rib 86 with an outer diameter D6 is formed. The relationship of the outer diameter D4, D5 and D6 of the flange portion 84, the body portion 85 and the outer peripheral rib 86 are set to be "outer diameter D4>outer diameter D6>outer diameter D5". The lead lines 61, 62, 63, 64 are respectively inserted into the four insert holes 82 from the flange portion 84 side and passed through to the body portion 85 side. In the embodiment, one of the side of the penetration direction where the lead lines 61, 62, 63, 64 are inserted is referred to as "enter side". The other side of the penetration direction which is the opposite side of the enter side is referred to as "exit side".

Figure 6:
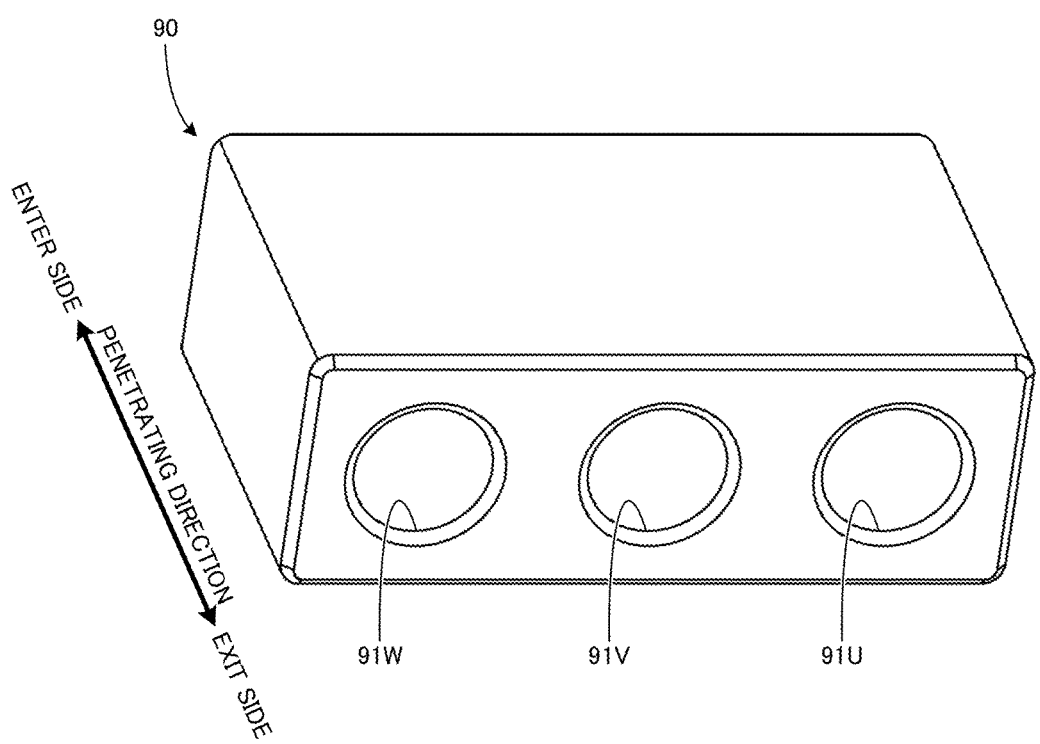
FIG. 6 is a perspective view illustrating a schematic structure of a bush supporting frame.

The bush supporting frame 90 is provided in a state with a part thereof covered by the molded portion 100 and is supported by the molded portion 100. The entire body of the drawing outlet portion 80 is supported by the molded portion 100 by having the molded portion 100 support the bush supporting frame 90 (see FIGS. 2 and 8). The bush supporting frame 90 is, for example, a resin molded body formed by resin molding. In the bush supporting frame 90, as shown in FIG. 6, a first attaching hole 91U, a second attaching hole 91V and a third attaching hole 91W are formed. The first bush 81U is fitted in into the first attaching hole 91U. The second bush 81V is fitted in into the second attaching hole 91V. The third bush 81W is fitted in into the third attaching hole 91W. The first bush 81U, the second bush 81V and the third bush 81W, respectively, are fitted in from the enter side toward the exit side of the penetration direction against the first attaching hole 91U, the second attaching hole 91V and the third attaching hole 91W.

Figure 7:
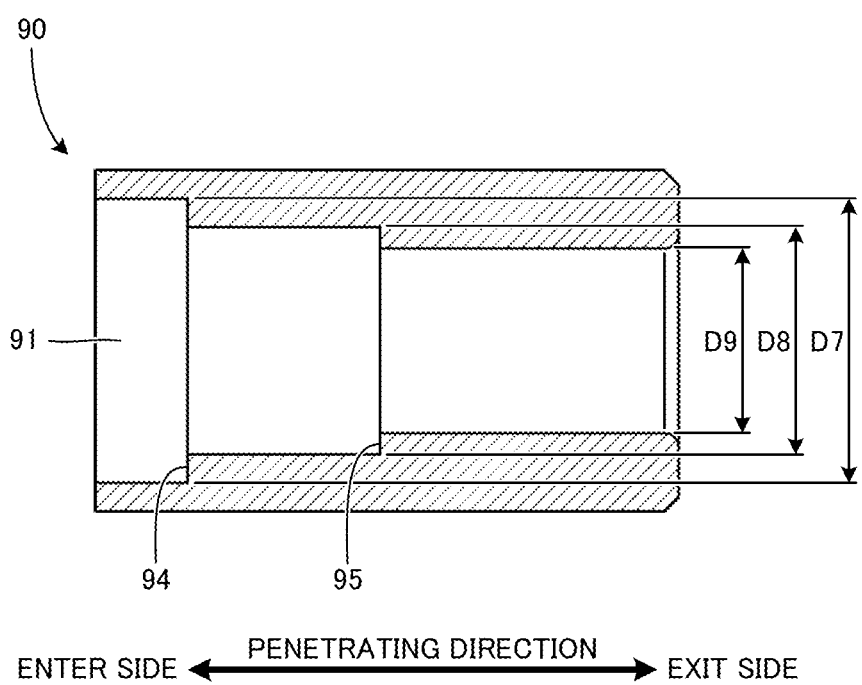
FIG. 7 is a sectional view of a bush supporting frame taken along a penetrating direction in a position of an attaching hole.

The first attaching hole 91U, the second attaching hole 91V and the third attaching hole 91W are through holes having a same shape passing through the penetration direction where each of the first bush 81U, the second bush 81V and the third bush 81W are fitted in (see FIG. 7). As described above, in the embodiment, the first bush 81U, the second bush 81V and the third bush 81W have the same shape. Therefore, the first attaching hole 91U, the second attaching hole 91V and the third attaching hole 91W where each of these bushes are fitted in have the same shape. In the embodiment, when the first attaching hole 91U, the second attaching hole 91V and the third attaching hole 91W are not distinct or when the attaching holes are collectively called, it is referred to as "attaching hole 91".

The attaching hole 91 has, as shown in FIG. 7, a stepped shape formed by a region of an inner diameter D7, a region of an inner diameter D8 and a region of an inner diameter D9 serially formed in the penetration direction. The relationship of the inner diameters D7, D8, D9 is set to be "inner diameter D7>inner diameter D8>inner diameter D9". When the bush 81 is fitted in into the attaching hole 91, the flange portion 84 is placed to a portion of the inner diameter D7 of the attaching hole 91, and the body portion 85 to which the outer peripheral rib 86 is formed is placed to a portion of the inner diameter D8 of the attaching hole 91 (see FIG. 8).

The inner diameter D7 is set to be smaller than the outer diameter D4 of the flange portion 84 (inner diameter D7<outer diameter D4). This is to make the fit with the flange portion 84 to a pressed-in state when the bush 81 is fitted in into the attaching hole 91. The inner diameter D8 is set to be smaller than the outer diameter D6 of the outer peripheral rib 86 (inner diameter D8<outer diameter D6). This is to make the fit with the outer peripheral rib 86 to a pressed-in state when the bush 81 is fitted in into the attaching hole 91. One of the inner diameter D7 and the inner diameter D8 may be set to a dimension where the fit with the flange portion 84 or the outer peripheral rib 86 becomes a transition-fit state (inner diameter D7=outer diameter D4 or inner diameter D8=outer diameter D6). The inner diameter D9 is set to be smaller than the outer diameter D5 of the body portion 85 (inner diameter D9<outer diameter D5). The inner diameter D9 is set to a dimension to the extent that the four lead lines 61, 62, 63, 64 of each phase can pass therethrough.

In the attaching hole 91, a ring shaped surface 94 is formed at a boundary of the inner diameters D7, D8. In the attaching hole 91, a ring shaped surface 95 is formed at a boundary of the inner diameters D8, D9. The fitting in the bush 81 into the attaching hole 91 is controlled by making the flange portion 84 contact the ring shaped surface 94 and making the body portion 85 contact the ring shaped surface 95.

The molded portion 100 includes, as shown in FIG. 2, ring portions 101, 102. The ring portion 101 covers the first end surface 32 at the first side of the lamination direction. A coil end portion of the coil 50 which corresponds to the first end surface 32 is covered by the ring portion 101. The ring portion 102 covers the second end surface at the second side of the lamination direction. A coil end portion of the coil 50 which corresponds to the second end surface is covered by the ring portion 102. The molded portion 100 is formed by resin molding. The ring portions 101, 102 are connected at a portion of the molded portion 100 which is filled inside the slot 36. According to this, the molded portion 100 is formed integrally. The ring portion 101, as described above, covers a portion of the drawing outlet portion 80 (bush supporting frame 90) and supports the drawing outlet portion (see FIGS. 2 and 8). As a resin to form the molded portion 100, thermosetting resin is shown as an example. For example, the molded portion 100 is formed by Bulk Molding Compound (BMC).

The resin molding is, after a wire winding step and a wire connecting step, carried out against the stator core 31 where the coil 50 is formed to each of the twelve teeth 35 via the insulation portion 56. That is, the resin molding is carried out by setting the stator core 31 described previously into a molding die provided in a molding machine for resin molding. The drawing outlet portion 80 is supported at a predetermined position of the molding die. In the wire winding step, the insulation portion 56 is attached to the stator core 31. Thereafter, in the wire winding step, the coil 50 is formed to each of the twelve teeth 35. In the wire connecting step, as described above, the neutral point N is formed. In the wire connecting step, for example, the lead lines 61U, 62U, 63U, 64U are respectively passed through the four first insert holes 82U of the first bush 81U, and the first bush 81U is fitted in into the first attaching hole 91U. In the wire connecting step, for example, the lead lines 61V, 62V, 63V, 64V are respectively passed through the four second insert holes 82V of the second bush 81V, and the second bush 81V is fitted in into the second attaching hole 91V. In the wire connecting step, for example, the lead lines 61W, 62W, 63W, 64W are respectively passed through the four third insert holes 82W of the third bush 81W, and the third bush 81W is fitted in into the third attaching hole 91W.

The lead lines 61U, 62U, 63U, 64U of the U-phase are in a state where they are respectively passed through the four first insert holes 82U of the first bush 81U. The first bush 81U is in a state where it is fitted in into the first attaching hole 91U. By making the first bush 81U fitted in into the first attaching hole 91U in a pressed-in state, the first bush 81U is compressed towards a radial direction. The radial direction is a direction which is orthogonal to the penetration direction. Associated with this, the four first insert holes 82U formed to the first bush 81U are compressed and deformed to the radial direction. The inner peripheral surfaces of the first insert holes 82U formed with the inner peripheral ribs 83 are pressed to the outer surfaces of the lead lines 61U, 62U, 63U, 64U which are respectively passed therethrough. The inner peripheral surfaces of the first insert holes 82U and the outer peripheral surfaces of the lead lines 61U, 62U, 63U, 64U are brought into a more tight contact state. The lead lines 61U, 62U, 63U, 64U are directly drawn out to the outside of the molded portion 100 from the first attaching hole 91U (see FIGS. 2 and 8).

The lead lines 61V, 62V, 63V, 64V of the V-phase are in a state where they are respectively passed through the four second insert holes 82V of the second bush 81V. The second bush 81V is in a state where it is fitted in into the second attaching hole 91V. By making the second bush 81V fitted in into the second attaching hole 91V in a pressed-in state, the second bush 81V is compressed towards the radial direction. Associated with this, the four second insert holes 82V formed to the second bush 81V are compressed and deformed to the radial direction. The inner peripheral surfaces of the second insert holes 82V formed with the inner peripheral ribs 83 are pressed to the outer surfaces of the lead lines 61V, 62V, 63V, 64V which are respectively passed therethrough. The inner peripheral surfaces of the second insert holes 82V and the outer peripheral surfaces of the lead lines 61V, 62V, 63V, 64V are brought into a more tight contact state. The lead lines 61V, 62V, 63V, 64V are directly drawn out to the outside of the molded portion 100 from the second attaching hole 91V (see FIGS. 2 and 8).

The lead lines 61W, 62W, 63W, 64W of the W-phase are in a state where they are respectively passed through the four third insert holes 82W of the third bush 81W. The third bush 81W is in a state where it is fitted in into the third attaching hole 91W. By making the third bush 81W fitted in into the third attaching hole 91W in a pressed-in state, the third bush 81W is compressed towards the radial direction. Associated with this, the four third insert holes 82W formed to the third bush 81W are compressed and deformed to the radial direction. The inner peripheral surfaces of the third insert holes 82W formed with the inner peripheral ribs 83 are pressed to the outer surfaces of the lead lines 61W, 62W, 63W, 64W which are respectively passed therethrough. The inner peripheral surfaces of the third insert holes 82W and the outer peripheral surfaces of the lead lines 61W, 62W, 63W, 64W are brought into a more tight contact state. The lead lines 61W, 62W, 63W, 64W are directly drawn out to the outside of the molded portion 100 from the third attaching hole 91W (see FIGS. 2 and 8).

The lead lines 61, 62, 63, 64 of each phase which were drawn out to the outside of the molded portion 100 are, for example, aggregated and covered by a member such as an insulation tube. Power supply terminals for connection or the like are attached to the top end portions of the lead lines 61, 62, 63, 64 of each phase.

Advantageous Effects of Embodiment

The lead lines 61U, 62U, 63U, 64U of the U-phase are directly drawn out to the outside of the molded portion 100 from the first attaching hole 91U (see FIGS. 2 and 8). The lead lines 61U, 62U, 63U, 64U are respectively passed through the four first insert holes 82U of the first bush 81U. The first bush 81U is fitted in into the first attaching hole 91U. The lead lines 61V, 62V, 63V, 64V of the V-phase are directly drawn out to the outside of the molded portion 100 from the second attaching hole 91V (see FIGS. 2 and 8). The lead lines 61V, 62V, 63V, 64V are respectively passed through the four second insert holes 82V of the second bush 81V. The second bush 81V is fitted in into the second attaching hole 91V. The lead lines 61W, 62W, 63W, 64W of the W-phase are directly drawn out to the outside of the molded portion 100 from the third attaching hole 91W (see FIGS. 2 and 8). The lead lines 61W, 62W, 63W, 64W are respectively passed through the four third insert holes 82W of the third bush 81W. The third bush 81W is fitted in into the third attaching hole 91W.

Accordingly, the wire connection of the lead lines 61, 62, 63, 64 of each phase are unnecessary in the portion covered by the molded portion 100. A wire connecting member such as a bus bar is unnecessary and it becomes possible to miniaturize the stator 30 in the lamination direction. The lead lines 61, 62, 63, 64 of each phase can be power lines for each phase. By fitting in the bush 81 into the attaching hole 91 which is formed to the bush supporting frame 90, it is possible to inhibit resin leakage in the resin mold when forming the molded portion 100. The plurality of inner peripheral ribs 83 are formed in the insert holes 82 of the bush 81 (see FIG. 5). Therefore, it is possible to inhibit resin leakage through the insert holes 82. In the example shown in FIG. 5, the inner peripheral ribs 83 are formed in a plurality of places including each open end portion of the enter side and the exit side of the penetration direction. Due to the inner peripheral ribs 83 formed to the open end portion of the enter side of the penetration direction, it is possible to inhibit the resin entering the insert hole 82.

Modifications

The embodiments can also be configured as follows. Even in the case where the following configurations are employed, the same advantageous effects as the above-described advantageous effects can be obtained. Each configuration described below can also be appropriately employed in combination. In below, explanation is made to points which are different from the above-described points and explanation to the points which are similar to the above-described points will be omitted properly.

(1) In the above description, the stator core 31 integrally formed with the plurality of teeth 35 and the yoke 34 have been described as an example (see FIGS. 1 and 2). The stator core, for example, may be a divisional type stator core. The divisional type stator core is formed by arranging stator core segments, which is divided in an equal angle at a portion of the yoke, in a ring shape. The stator core segment includes a yoke portion and a tooth. The yoke portion forms a yoke in the stator core in a state which is arranged in a ring shape. The stator core segment is formed by laminating electrical steel sheets while punching the electrical steel sheet with a press machine. For example, a same stator core as the stator core 31 shown in FIG. 1 is formed by the stator core segment. In this case, the stator core segment has a shape where one tooth is protruded from the yoke portion. The stator core is formed by arranging twelve stator core segments in a ring shape.

In a wire winding step, for each stator core segment, a coil 50 is formed by a predetermined wire winding machine. When forming the coil 50, the stator core segment is covered by an insulation portion corresponding to the shape of the stator core segment. In forming the coil 50 to the stator core segment, a publicly known wire winding technology can be employed.

A wire connecting step is carried out as the same as the above description. That is, in the wire connecting step, a neutral point N is formed. In the wire connecting step, for example, the lead lines 61U, 62U, 63U, 64U are respectively passed through the four first insert holes 82U of the first bush 81U, and the first bush 81U is fitted in into the first attaching hole 91U. In the wire connecting step, for example, the lead lines 61V, 62V, 63V, 64V are respectively passed through the four second insert holes 82V of the second bush 81V, and the second bush 81V is fitted in into the second attaching hole 91V. In the wire connecting step, for example, the lead lines 61W, 62W, 63W, 64W are respectively passed through the four third insert holes 82W of the third bush 81W, and the third bush 81W is fitted in into the third attaching hole 91W. Thereafter, the plurality of stator core segments shaped in a ring-shaped state are set into a molding die provided in a molding machine for resin molding. For example, based on the above-described example, the twelve stator core segments are set into the molding die in a ring shape state. Next, resin molding is carried out. According to this, the molded portion 100 is formed. By the molded portion 100, the twelve stator core segments are supported in a ring shape state. The plurality of stator core segments are shaped in a ring shape at a predetermined timing. For example, the plurality of stator core segments are shaped in a ring shape at a timing when it is after the wire winding step and is before the wire connecting step or when during the wire connecting step.

Figure 9:
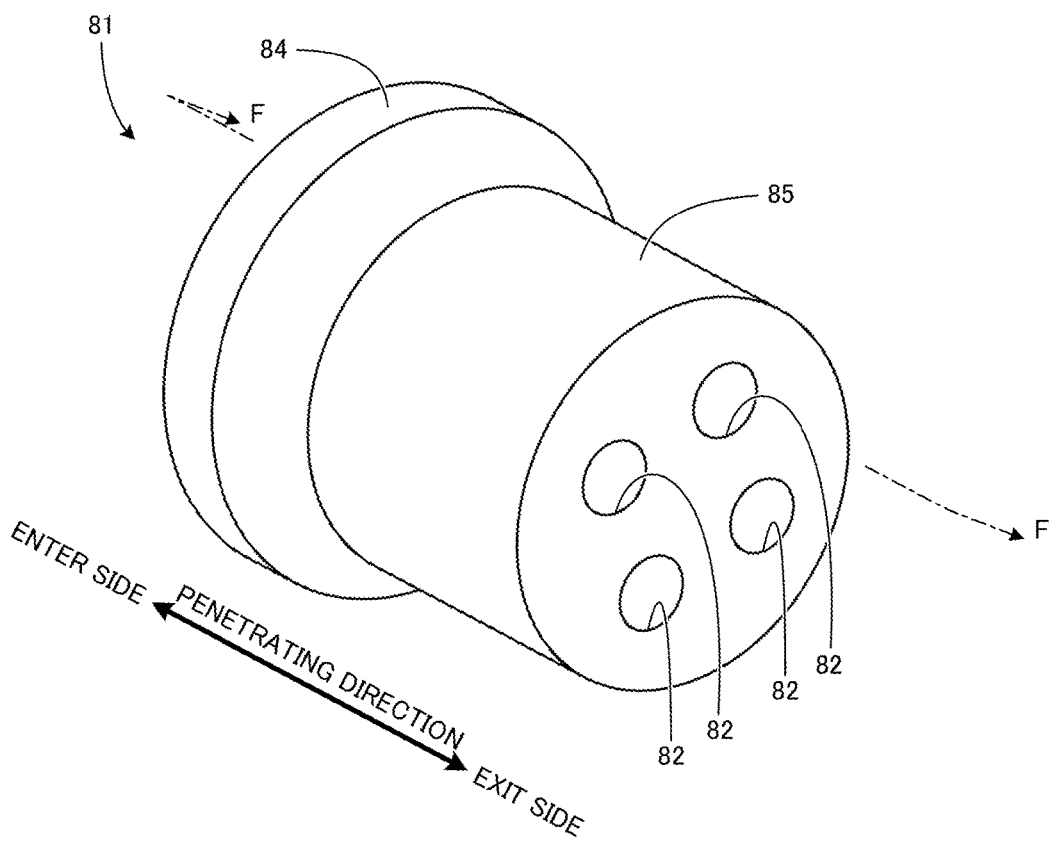
FIG. 9 is a perspective view illustrating another example of a schematic structure of a bush.
Figure 10:
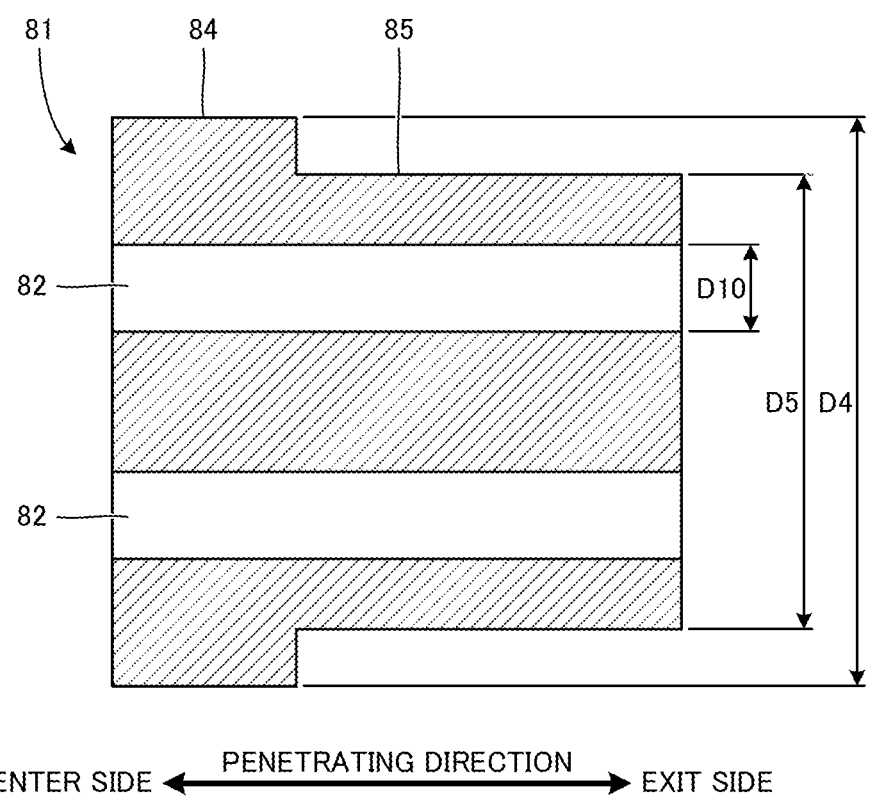
FIG. 10 is a sectional view taken along line F-F of FIG. 9
Figure 11:
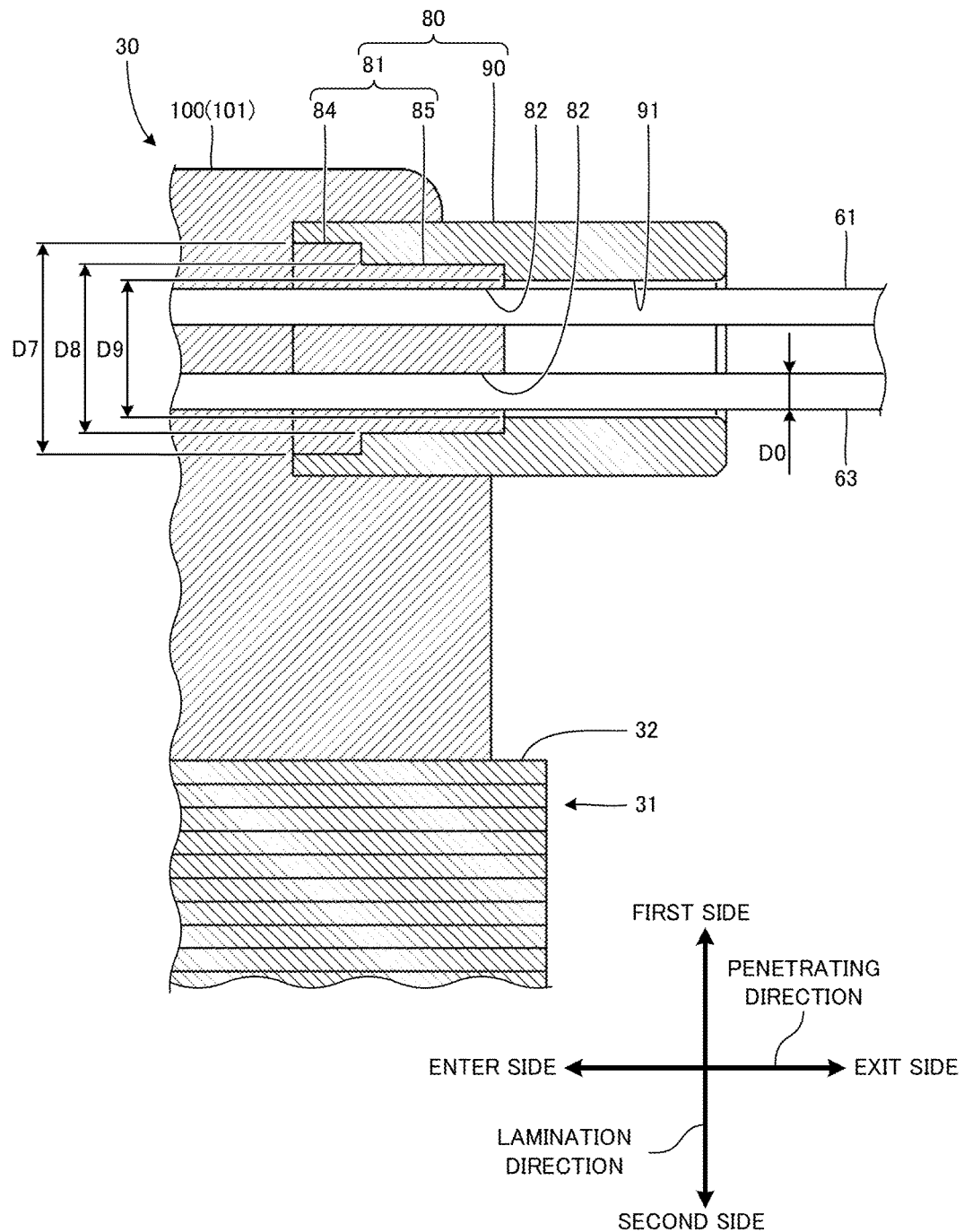
FIG. 11 is a partial sectional view of a stator taken along a penetrating direction in a position of an insert hole and an attaching hole. A schematic structure of the stator having a drawing outlet portion based on the bush illustrated in FIGS. 9 and 10 is illustrated.

(2) In the above description, the bush 81 having the outer peripheral rib 86 formed to the body portion 85 and the inner peripheral ribs 83 formed to the inner peripheral surfaces of the insert holes 82 (see FIGS. 4 and 5) has been described as an example. The bush, as shown in FIGS. 9 and 10, may be a bush 81 whose outer peripheral rib 86 is eliminated. The bush, as shown in FIG. 10, may be a bush 81 whose inner peripheral rib 83 is eliminated. In the bush 81 whose inner peripheral ribs 83 are eliminated, insert holes 82 which do not have concaves and convexes at the inner peripheral surfaces are formed. The bush 81 corresponds to each of the first bush 81U, the second bush 81V and the third bush 81W. In FIGS. 9 through 11, except a part, to clear the correspondence with FIGS. 4, 5 and 8, the same or the corresponding portions of each portion in the above description will be indicated by the same reference symbol. In FIG. 11, illustration of a part of the configurations of the coil 50 and the like are omitted.

In the bush 81 shown in FIGS. 9 and 10, an inner diameter D10 of the insert hole 82 is, for example, set as follows. That is, the inner diameter D10 of the insert hole 82 is set to be smaller than an outer diameter D0 (see FIG. 11) of the lead lines 61, 62, 63, 64 (inner diameter D10<outer diameter D0). Alternatively, the inner diameter D10 of the insert hole 82 is set to be the same with the outer diameter D0 (for example, inner diameter D10=outer diameter D0). With respect to the bush supporting frame 90 (see FIG. 11) with the bush 81 as shown in FIGS. 9 and 10, the inner diameter D8 of the attaching hole 91 is set as follows. That is, the inner diameter D8 of the attaching hole 91 is set to be smaller than the outer diameter D5 of the body portion 85 (inner diameter D8<outer diameter D5). This is to make the fit with the body portion 85 to a pressed-in state when the bush 81 shown in FIGS. 9 and 10 is fitted in into the attaching hole 91. With respect to the fitting in the bush 81 shown in FIGS. 9 and 10 into the attaching hole 91, one of the inner diameter D7 and the inner diameter D8 may be set as follows. That is, one of the inner diameter D7 and the inner diameter D8 may be set to a dimension where the fit with the flange portion 84 or the body portion 85 becomes a transition-fit state (inner diameter D7=outer diameter D4 or inner diameter D8=outer diameter D5). With respect to the other points, the bush 81 shown in FIGS. 9 and 10 are the same as the bush 81 shown in FIGS. 4 and 5.

As like the bush 81 shown in FIGS. 4 and 5, by using the bush 81 shown in FIGS. 9 and 10, the lead lines 61, 62, 63, 64 of each phase can be directly drawn out to the outside of the molded portion 100 from the attaching hole 91 (see FIG. 11). By making the bush 81 fitted in into the attaching hole 91 in a pressed-in state, the bush 81 is pressed towards the radial direction. Associated with this, the four insert holes 82 formed to the bush 81 are compressed and deformed to the radial direction. The inner peripheral surfaces of the insert holes 82 are pressed to the outer surfaces of the lead lines 61, 62, 63, 64 which are respectively passed therethrough. The inner peripheral surfaces of the insert holes 82 and the outer peripheral surfaces of the lead lines 61, 62, 63, 64 are brought into a more tight contact state. An unillustrated bush without one of the inner peripheral ribs 83 and the outer peripheral rib 86 can be adopted.

Figure 12:
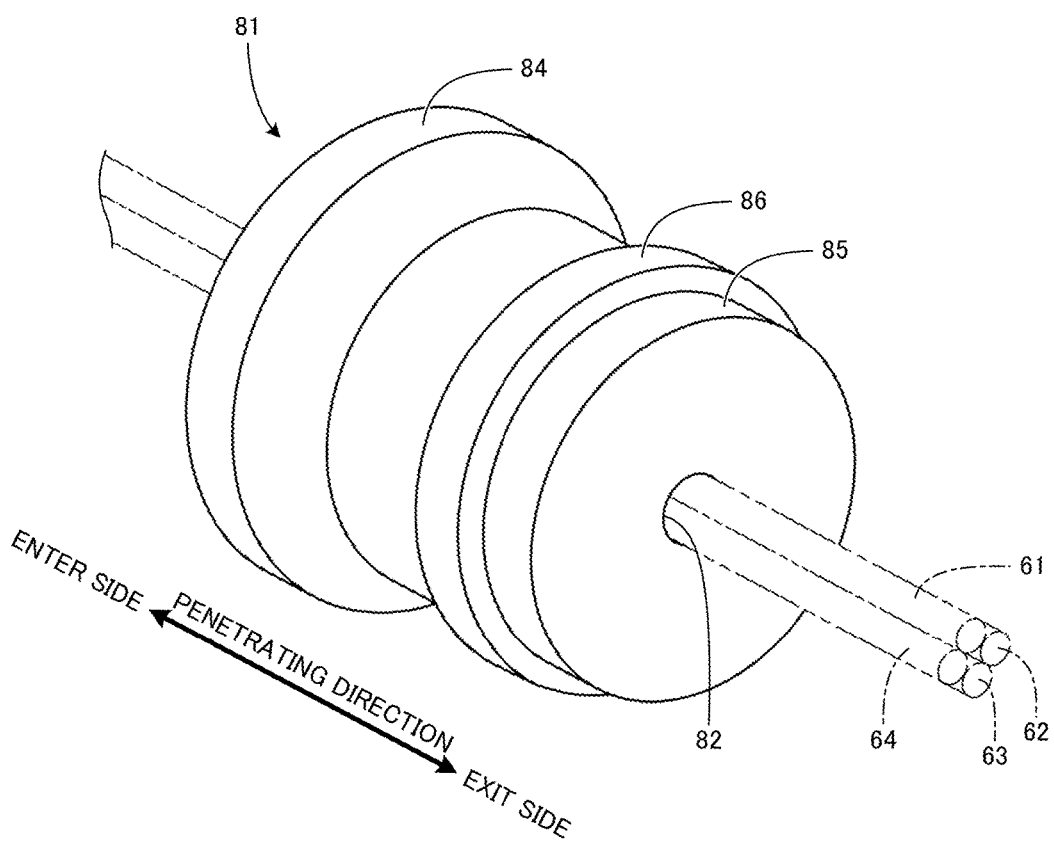
FIG. 12 is a perspective view illustrating still another example of a schematic structure of a bush.

(3) In the above description, the bush 81 formed with four insert holes 82 which corresponds to the number of the four lead lines 61, 62, 63, 64 of each phase has been described as an example (see FIGS. 4 and 5). The bush may be the bush 81 which is formed with an insert hole 82 whose number is fewer than that of the lead lines of each phase on the power supply side (for example, see FIG. 12). In the insert hole 82, the plurality of lead lines of each phase are passed therethrough. Based on the above description, the lead lines of each phase on the power supply side are lead lines 61, 62, 63, 64. The bush 81 corresponds to the first bush 81U, the second bush 81V and the third bush 81W, respectively. The insert hole 82 corresponds to the first insert hole 82U, the second insert hole 82V and the third insert hole 82W, respectively. That is, two or more among the four lead lines 61, 62, 63, 64 of each phase are passed through one insert hole 82. For example, as shown in FIG. 12, assuming that the number of the insert hole 82 formed in bush 81 is one. In this case, the entire lead lines 61, 62, 63, 64 of one phase are gathered and passed through one insert hole 82. The shape and dimension of the inner diameter of the insert hole 82 is set properly by considering the shape and dimension of the lead lines in the case when the plurality of lead lines are gathered together. For example, in the bush 81 shown in FIG. 12, the shape and dimension of the inner diameter of the insert hole 82 is set to make the gathered four lead lines 61, 62, 63, 64 to a pressed-in state. In the state when this bush 81 is fitted in into the attaching hole 91, the gap between the insert hole 82 and the plurality of lead lines can be reduced. In the state when the gap is small, the state includes when there are no gap. With respect to the other points, the bush 81 shown in FIG. 12 are the same as the bush 81 shown in FIGS. 4 and 5. The bush 81 shown in FIG. 12 may be configured without the inner peripheral ribs 83 and/or the outer peripheral rib 86.

(4) In the above description, the first bush 81U, the second bush 81V, and the third bush 81W were provided to correspond to the lead lines 61, 62, 63, 64 of each phase (see FIGS. 3 and 8). The first bush 81U is fitted in into the first attaching hole 91U. The second bush 81V is fitted in into the second attaching hole 91V. The third bush 81W is fitted in into the third attaching hole 91W. According to this, the drawing open portion 80 is configured.

Figure 13:
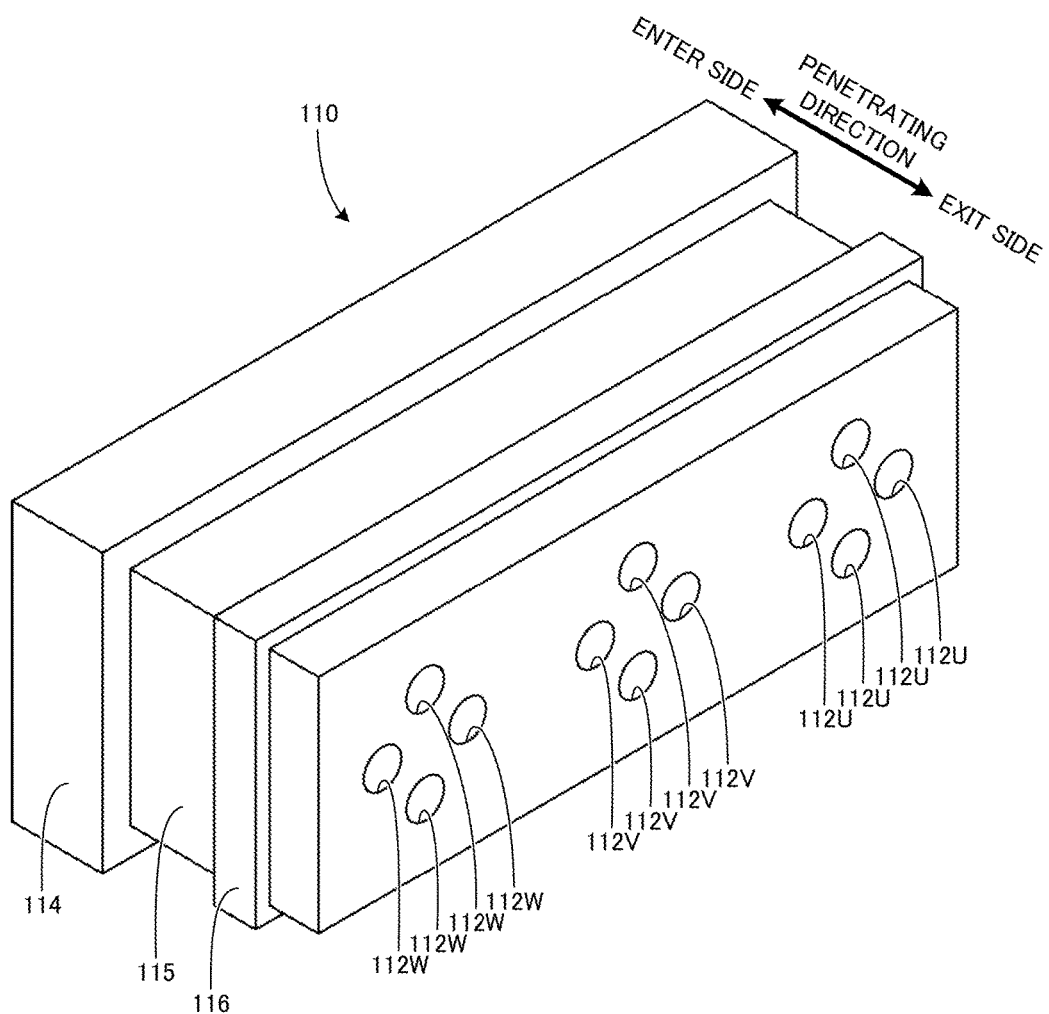
FIG. 13 is a perspective view illustrating still another example of a schematic structure of a bush.

The bush, as shown in FIG. 13, may be a bush 110 having the first bush 81U, the second bush 81V and the third bush 81W integrated. In the integral type bush 110, four first insert holes 112U, four second insert holes 112V and four third insert holes 112W are formed thereto. In the four first insert holes 112U, lead lines 61U, 62U, 63U, 64U are respectively passed therethrough. In the four second insert holes 112V, lead lines 61V, 62V, 63V, 64V are respectively passed therethrough. In the four third insert holes 112W, lead lines 61W, 62W, 63W, 64W are respectively passed therethrough. The first insert holes 112U, the second insert holes 112V and the third insert holes 112W are through holes that have the same shape of the insert hole 82 which is described above based on FIG. 5 or 10. Therefore, explanation regarding to the shape and the like of the first insert holes 112U, the second insert holes 112V and the third insert holes 112W are omitted.

The bush 110 is, as the bush 81 as described above, for example, formed by an elastic member having elasticity as rubber. The bush 110 has an integral shape where a flange portion 114 and a body portion 115 continues in a penetration direction. The penetration direction is, as in the above description, a direction where the first insert holes 112U, the second insert holes 112V and the third insert holes 112W extends. In a predetermined region of the body portion 115 in the penetration direction, an outer peripheral rib 116 is formed. The "flange portion 114" in the bush 110 corresponds to the "flange portion 84" in the bush 81. The "body portion 115" in the bush 110 corresponds to the "body portion 85" in the bush 81. The "outer peripheral rib 116" in the bush 110 corresponds to the "outer peripheral rib 86" in the bush 81.

When the bush 110 is employed, one attaching hole corresponding to the shape of the bush 110 is formed to an unillustrated bush supporting frame. This bush supporting frame configures with the bush 110 a drawing outlet portion. This attaching hole passes through the bush supporting frame in the penetration direction. An inner peripheral surface of the attaching hole has a stepped shape as same as the shape of the cross section of the bush supporting frame 90 shown in FIGS. 7 and 8. That is, the inner peripheral surface of the attaching hole has a shape which corresponds to the shape of the flange portion 114 and the body portion 115 which is formed with the outer peripheral rib 116. In the state where the bush 110 is fitted in into the attaching hole, the fit with the flange portion 114, the body portion 115 and the outer peripheral rib 116, and each portion in the attaching hole that corresponds to these flange portion, body portion and outer peripheral rib is the same as the bush 81 and the attaching hole 91. That is, the flange portion 114 and/or the outer peripheral rib 116 is in the pressed-in state against each corresponding portion of the attaching hole. The bush 110 may be configured without the outer peripheral rib 116. The first insert hole 112U, the second insert hole 112V and the third insert hole 112W may be configured to have the plurality of lead lines gathered and passed therethrough as described above based on FIG. 12.

(5) With respect to the position of the neutral point N, the neutral point N is, for example, provided in the inside of the ring portion 101 of the molded portion 100 at the first side of the lamination direction. In this case, the lead lines 71U, 72U, 73U, 74U of the U-phase, the lead lines 71V, 72V, 73V, 74V of the V-phase and the lead lines 71W, 72W, 73W, 74W of the W-phase are arranged on the first end surface 32 which is covered by the ring portion 101. The configuration which draws out the lead lines 61, 62, 63, 64 of each phase to the outside of the molded portion 100 can also be employed against the lead lines 71U, 72U, 73U, 74U, the lead lines 71V, 72V, 73V, 74V and the lead lines 71W, 72W, 73W, 74W. According to this configuration, the lead lines 71U, 72U, 73U, 74U, the lead lines 71V, 72V, 73V, 74V and the lead lines 71W, 72W, 73W, 74W are drawn out to the outside of the molded portion 100. The neutral point N is provided at the outside of the molded portion 100.

(6) In the above description, the three-phase AC rotary machine 20 has been described as an example. The configuration to draw out the lead lines 61, 62, 63, 64 of each phase to the outside of the molded portion 100 can also be employed to other rotary machines having different number of phases. For example, in this configuration, it can also be employed to a two-phase AC rotary machine. That is, the drawing outlet portion 80 (see FIGS. 2, 8 and 11) provided by the bush 81 and the bush supporting frame 90 can be employed against the two-phase AC rotary machine. Other than this, an unillustrated drawing outlet portion provided by the bush 110 and the like can be employed to the two-phase AC rotary machine.

(7) In the above description, the inner rotation type rotary machine 20 having the rotor 22 rotatably supported in the inner peripheral side of the stator 30 has been described as an example (see FIG. 1). The configuration to draw out the lead lines 61, 62, 63, 64 of each phase to the outside of the molded portion 100 can also be employed to a stator of an outer rotation type rotary machine. That is, as shown in FIGS. 2, 8 and 11, the drawing outlet portion 80 provided by the bush 81 and the bush supporting frame 90 can also be employed against the stator of the outer rotation type rotary machine. Other than this, an unillustrated drawing outlet portion provided by the bush 110 and the like can also be employed against the stator of the outer rotation type rotary machine. In the stator of the outer rotation type rotary machine, a plurality of teeth are protruded to the outside from a yoke in a radial direction having a shaft of a rotor as the center. The rotor of the outer rotation type rotary machine is, at the outside of the stator, opposed to the plurality of teeth. In the plurality of teeth, as in the above description, one of the coils of the U-phase, V-phase and W-phase are formed, respectively. The conducting wire that forms the coil is drawn out at a winding start side and a winding end side of each coil. Each drawn out conducting wire form two lead lines, respectively. One of the two lead lines is, as in the above description, passed through the insert hole of the bush (see FIGS. 4 and 5, FIGS. 9 and 10 or 13). This bush is fitted in into the attaching hole. The lead line described previously is directly drawn out to the outside of the molded portion from the attaching hole. Other descriptions related to the outer rotation type rotary machine to which the embodiment is applied is omitted.

DESCRIPTION OF REFERENCE SIGNS

20: Rotary machine
22: Rotor
23: Rotor core
24: Shaft
30: Stator
31: Stator core
32: First end surface
34: Yoke
35: Tooth
36: Slot
50: Coil
51U, 52U, 53U, 54U: Coil
51V, 52V, 53V, 54V: Coil
51W, 52W, 53W, 54W: Coil
56: Insulation portion
61, 62, 63, 64: Lead line
61U, 62U, 63U, 64U: Lead line
61V, 62V, 63V, 64V: Lead line 61W, 62W, 63W, 64W: Lead line
71U, 72U, 73U, 74U: Lead line
71V, 72V, 73V, 74V: Lead line
71W, 72W, 73W, 74W: Lead line
80: Drawing outlet portion
81: Bush
81U: First bush
81V: Second bush
81W: Third bush
82: Insert hole
82U: First insert hole
82V: Second insert hole
82W: Third insert hole
83: Inner peripheral rib
84: Flange portion
85: Body portion
86: Outer peripheral rib
90: Bush supporting frame
91: Attaching hole
91U: First attaching hole
91V: Second attaching hole
91W: Third attaching hole
94, 95: Ring shaped surface
100: Molded portion
101, 102: Ring portion
110: Bush
112: Insert hole
112U: First insert hole
112V: Second insert hole
112W: Third insert hole
114: Flange portion
115: Body portion
116: Outer peripheral rib
D0, D4, D5, D6: Outer diameter
D1, D2, D7, D8, D9, D10: Inner diameter
N: Neutral point

The invention claimed is:

1. A rotary machine, comprising:
a rotor; and
a resin-molded stator,
wherein the stator includes:
a stator core formed by laminating steel sheets;
a coil formed by winding a conducting wire around a tooth formed to the stator core;
a molded portion covering the coil formed to the stator core;
a lead line formed by the conducting wire continuing from an end portion of a power supply side of the coil;
a bushing formed with a penetrated insert hole where the lead line is passed through; and
a bushing supporting frame which is supported by the molded portion and which is formed with a penetrated attaching hole which connects to an outside of the molded portion into which the bushing is fitted,
wherein the bushing supporting frame is made of a material different than the bushing, and
wherein the lead line is drawn out to the outside of the molded portion from the attaching hole in a state where the lead line is passed through the insert hole and the bushing is press fitted into the attaching hole of the bushing supporting frame.

2. The rotary machine according to claim 1, wherein the stator includes:
at least one coil including:
a U-phase coil;
a V-phase coil; and
a W-phase coil,
at least one lead line including:
a U-phase lead line formed by the conducting wire continuing from the end portion of the power supply side of the U-phase coil;
a V-phase lead line formed by the conducting wire continuing from the end portion of the power supply side of the V-phase coil; and
a W-phase lead line formed by the conducting wire continuing from the end portion of the power supply side of the W-phase coil, and
at least one bushing including:
a first bushing formed with a first insert hole as the insert hole which the U-phase lead line is passed through;
a second bushing formed with a second insert hole as the insert hole which the V-phase lead line is passed through; and
a third bushing formed with a third insert hole as the insert hole which the W-phase lead line is passed through,
wherein, to the bushing supporting frame there are formed
a first attaching hole which is the attaching hole where the first bushing is press fitted,
a second attaching hole which is the attaching hole where the second bushing is press fitted, and
a third attaching hole which is the attaching hole where the third bushing is press fitted,
wherein the U-phase lead line is drawn out to the outside of the molded portion from the first attaching hole in a state where the U-phase lead line is passed through the first insert hole and the first bushing is press fitted into the first attaching hole,
wherein the V-phase lead line is drawn out to the outside of the molded portion from the second attaching hole in a state where the V-phase lead line is passed through the second insert hole and the second bushing is press fitted into the second attaching hole, and
wherein the W-phase lead line is drawn out to the outside of the molded portion from the third attaching hole in a state where the W-phase lead line is passed through the third insert hole and the third bushing is press fitted into the third attaching hole.

3. The rotary machine according to claim 2, wherein the stator includes:
as the coils:
two or more predetermined number of the U-phase coils;
two or more predetermined number of the V-phase coils; and
two or more predetermined number of the W-phase coils,
as the lead lines:
a predetermined number of the U-phase lead lines which are formed by the conducting wires continuing from each end portion of the two or more predetermined number of the U-phase coils;
a predetermined number of the V-phase lead lines which are formed by the conducting wires continuing from each end portion of the two or more predetermined number of the V-phase coils; and
a predetermined number of the W-phase lead lines which are formed by the conducting wires continuing from each end portion of the two or more predetermined number of the W-phase coils, and
as the bushings:
the first bushing formed with a predetermined number of the first insert holes where the predetermined number of the U-phase lead lines are passed through, respectively;
the second bushing formed with a predetermined number of the second insert holes where the predetermined number of the V-phase lead lines are passed through, respectively; and
the third bushing formed with a predetermined number of the third insert holes where the predetermined number of the W-phase lead lines are passed through, respectively,
wherein the predetermined number of the U-phase lead lines are drawn out to the outside of the molded portion from the first attaching hole in a state where the predetermined number of the U-phase lead lines are respectively passed through the predetermined number of the first insert holes and the first bushing is press fitted into the first attaching hole,
wherein the predetermined number of the V-phase lead lines are drawn out to the outside of the molded portion from the second attaching hole in a state where the predetermined number of the V-phase lead lines are respectively passed through the predetermined number of the second insert holes and the second bushing is press fitted into the second attaching hole, and
wherein the predetermined number of the W-phase lead lines are drawn out to the outside of the molded portion from the third attaching hole in a state where the predetermined number of the W-phase lead lines are respectively passed through the predetermined number of the third insert holes and the third bushing is press fitted into the third attaching hole.

4. The rotary machine according to claim 1, wherein the bushing includes a ring shaped press-in portion protruding in a radial direction of the bushing at an outer peripheral surface of the bushing, wherein
an inner diameter of the attaching hole in the position where the press-in portion is placed in a state where the bushing is press fitted into the attaching hole is set to be smaller than an outer diameter of the press-in portion.

5. The rotary machine according to claim 2, wherein
each of the first, second and third bushings includes a ring shaped press-in portion protruding in a radial direction of each of the first, second and third bushings at an outer peripheral surface of each of the first, second and third bushings, wherein
an inner diameter of each of the first, second and third attaching holes in the position where the press-in portion is placed in a state where each of the first, second and third bushings is press fitted into each of the first, second and third attaching holes, respectively, is set to be smaller than an outer diameter of the press-in portion.

6. The rotary machine according to claim 3, wherein
each of the first, second and third bushings includes a ring shaped press-in portion protruding in a radial direction of each of the first, second and third bushings at an outer peripheral surface of each of the first, second and third bushings, wherein
an inner diameter of each of the first, second and third attaching holes in the position where the press-in portion is placed in a state where each of the first, second and third bushings is press fitted into each of the first, second and third attaching holes, respectively is set to be smaller than an outer diameter of the press-in portion.

7. The rotary machine according to claim 1, wherein the penetrated insert hole defines a channel within the bushing where the lead line passes through, the channel including expanded and contracted portions provided therein such that a diameter of the lead line is larger than a diameter of the contracted portions and smaller than a diameter of the expanded portions.

8. The rotary machine according to claim 3, wherein the two or more predetermined number of each of the U-phase coils, the V-phase coils and the W-phase coils are connected in a star configuration.

9. The rotary machine according to claim 3, wherein the two or more predetermined number of each of the U-phase coils, the V-phase coils and the W-phase coils are connected in parallel to each other.

10. The rotary machine according to claim 3, wherein the lead lines of each of the U-phase coils, the V-phase coils and the W-phase coils are drawn out to the outside of the molded portion such that the lead lines for the U-phase coils are connected to each other, the lead lines for the V-phase coils are connected to each other and the lead lines for the W-phase coils are connected to each other outside of the molded portion.

11. The rotary machine according to claim 3, wherein a number of the U-phase coils, the V-phase coils and the W-phase coils equals a same number as the U-phase lead lines, the V-phase lead lines and the W-phase lead lines which equals the same number as the first insert holes, the second insert holes and the third insert holes.

* * * * *